United States Patent [19]

Aulick et al.

[11] Patent Number: 5,223,028
[45] Date of Patent: Jun. 29, 1993

[54] WATERFAST AQUEOUS INKS

[75] Inventors: Rodney O. Aulick; Bradley L. Beach; Terence E. Franey; James M. Mrvos; Ann M. Piekunka, all of Lexington; Jerry F. Stone, Georgetown, all of Ky.

[73] Assignee: Lexmark International, Inc., Greenwich, Conn.

[21] Appl. No.: 746,545

[22] Filed: Aug. 19, 1991

[51] Int. Cl.$^5$ .................................................. C09D 11/02
[52] U.S. Cl. ........................... 106/22 H; 106/20 R; 523/160; 524/190; 524/612
[58] Field of Search ............ 106/20, 22, 23; 523/160; 524/190, 612; 260/DIG. 38

[56] References Cited

U.S. PATENT DOCUMENTS

| | | | |
|---|---|---|---|
| 4,155,768 | 5/1979 | Adams et al. | 106/23 |
| 4,197,135 | 4/1980 | Bailey et al. | 106/23 |
| 4,659,382 | 4/1987 | Kang | 106/22 |
| 4,789,400 | 12/1988 | Solodar et al. | 106/22 |
| 4,963,186 | 11/1990 | Hindagolla | 106/22 |
| 4,963,189 | 10/1990 | Hindagolla | 106/22 |
| 5,017,644 | 5/1991 | Fuller et al. | 524/612 |
| 5,062,893 | 11/1991 | Adamic et al. | 106/22 |

FOREIGN PATENT DOCUMENTS 356080  2/1990  European Pat. Off. .

OTHER PUBLICATIONS

European Patent Application 348,050, published Dec. 27, 1989.

*Primary Examiner*—William R. Dixon, Jr.
*Assistant Examiner*—Helene Klemanski
*Attorney, Agent, or Firm*—John A. Brady

[57] ABSTRACT

A waterfast ink having 3.0% Food Black 2, 2.5% highly hydroxyethylated polyethyleneimine, 10.0% ammonium benzoate, and the balance water. The invention appears to function upon loss of water after printing by a polar neutralizing between the dye and the polyimine, which results in an affinity of the dye to paper. It is applicable to any dye having anionic solubilizing groups but not having quaternary ammonium and to any ammonium salt.

16 Claims, No Drawings

WATERFAST AQUEOUS INKS

DESCRIPTION

1. Technical Field

This invention relates to aqueous liquid inks which are waterfast when applied. Such inks may be printed or otherwise applied in any matter, but typically are applied by drop on demand printing.

2. Background of the Invention

This invention employs hydroxyethylated polyethyleneimine (EPEI) as one of four essential ingredients, the other being the water vehicle, certain dyes, and an ammonium salt. EPEI is employed in such inks having waterfast properties, as disclosed in U.S. Pat. Nos. 4,197,135 to Bailey et al and 4,155,768 to Adams et al. Hydroxyethylation met two problems associated with unsubstituted polyethyleneimine (PEI) as the corresponding ingredient, the problems being degradation of the dye by reduction of azo links in the dye and the necessity for high pH to maintain ink stability. (High pH requires protective design of printheads using such inks, which often is prohibitively difficult.) European Patent Application 348,050, published Dec. 27, 1989, teaches a waterfast dye having polyethyleneimines chemically linked to the dye molecule. U.S. Pat. No. 4,789,400 to Solodar et al, teaches a waterfast ink of hydroxypropylated polyethyleneimine and a dye, but with no ammonium component disclosed.

The hydroxyethylation, however, significantly reduces the effectiveness of PEI as a waterfastness aid. In accordance with this invention the cause of this loss of waterfastness is now understood. The waterfastness mechanism of PEI and EPEI is now understood to be related to the basic ionization exponent (pKa) of the imide nitrogens present in those molecules. As the pH of the bulk or printed ink drops, those nitrogens become protonated more readily with higher pKa, and such protonation transforms the PEI into a cation which complexes with the dye. If that complex is insoluble, the dye becomes insoluble.

The pKa of triethylamine is 11.0, while the pKa of triethanolamine is 7.7. The pKa of diethylamine is 10.5, while the pKa of diethanol-amine is 8.8, and the pKa of ethylamine is 10.6, while the pKa of ethanol-2-amine is 9.6. Thus, hydroxyethylation lowers the pKa, and this effect is heightened by additional hydroxyethylation.

Thus, the links with PEI must be kept at high pH so that the PEI does not become sufficiently protonated to cause the dye to become insoluble in the ink. Beneficially, when the ink is printed on paper, the normal tendency for pH to drop moderately is sufficient to cause the PEI to become protonated and thus render the dye insoluble and water resistant.

In the case of EPEI, the pH at becomes sufficiently protonated to render the dye insoluble is much lower. Therefore, lower pH stable inks are realized, but it is much more difficult to have the pH of the print lowered sufficiently so as to impart the desired water resistance to the printing.

In accordance with this invention EPEI and an salt are employed in an ink. The range of stability of the ink to pH changes is not significantly impaired, but a new and not fully understood mechanism occurs to achieve excellent waterfastness. U.S. Pat. No. 5 017 644 to Fuller et al in Example XIII, found on column 13, discloses a waterfast, aqueous ink having 5 percent by weight of linear poly(2-hydroxyethylethyleneimine) with the ammonium salt of Atlantic Direct Turquoise 10 G Liquid dye, as well as other ingredients. Such a complex of a dye with ammonium does not constitute a separate ammonium salt as employed in this invention and does not suggest an amount of ammonium salt greater than that to serve as the counter ion to the dye.

Example XIII further includes ammonium hydroxide. U.S. Pat. No. 4,963,189 to Hindagolla also discloses a waterfast ink containing ammonium hydroxide and also mentions employing ammonium borate as a buffer, but with no mention of employing a polyimine. For basic paper beginning at column 3, line 21 this patent teaches adding an ammonium salt to the ink. The solubility of the dye in this patent is pH dependent, while the invention of this application can be practiced with dyes which are soluble at any pH.

BRIEF DISCLOSURE OF THE INVENTION

This invention is a waterfast liquid ink formulation characterized by water or equivalent polar solvent (i.e. water and alcohol mixture), dye having solubilizing groups such as sulfonate or carboxylate groups, hydroxy alkyl substituted PEI, and an ammonium salt. The ink stability advantages of employing the substituted PEI are realized, while, upon loss of the water at printing, the dye/EPEI complex becomes insoluble in water at neutral or acid pH. Exceptional waterfast effects are realized within minutes of printing. Additionally, such printing is highly waterfast to somewhat basic water for a short time sufficient to permit spilled water to be removed with little or no loss of print fidelity.

BEST MODE FOR CARRYING OUT THE INVENTION

The preferred formula of this invention is, by weight: 3.0% Food Black 2 (FB2); 2.5% polyethylenelmine hydroxyethylated at about 95% or greater of the available imine nitrogens (molecular weight 2000); 10% ammonium benzoate; and 84.5% deionized water. with 8% ammonium benzoate have been found to be effective for printing, and to exhibit virtually 100% waterfastness in substantially neutral or acidic water, as does the preferred formula. Dramatically smaller amounts of the ammonium salt, such as 1% would react in the same manner with respect to the dye and EPEI on loss of water, but not in sufficient proportion to exhibit high waterfastness.

Substitution of the ammonium benzoate with ammonium hydroxide solution exhibits much less waterfastness. Thus, ink of the following formula exhibited only 60% waterfastness 10 minutes after printing, while the preferred formula exhibited 100% waterfastness under the same conditions. The ammonium hydroxide formula was the following, by weight: 3.0% FB; 2.5% the hydroxyethylated polyethyleneimine of the foregoing formula; 5.0% 14.8M ammonium hydroxide solution, and 89.5% deionized water.

Food Black 2 is soluble in water at any pH. The mechanism of the waterfastness achieved in accordance with this invention is apparently one of polar neutralization between the dye anionic substituents and the protonated sites of the EPEI, while the cation of the ammonium salt assures a significant drop in pH with the loss of its ammonium moiety. Such a neutralized dye is known to have an affinity with ordinary paper, which comprises cellulose. The waterfastness appears excellent regardless of the pH of water applied to remove such printing, although printing does dissolve in time in basic water. Ammonium chloride and ammonium acetate have been examined and appear similarly effective in the same manner as the ammonium benzoate The waterfastness occurs within minutes of printing which suggests exceptional mechanism occurs, since typical waterfast inks having ammonium hydroxide do not achieve significant waterfastness for hours.

Food black dye has only sulfonate groups as the solubilizing group. Dyes with ionic quaternary ammonium groups, which are cationic, do not appear similarly effective in even when such dyes also have anionic solubilizing groups.

To illustrate the general applicability of this invention a Hewlett-Packard Co. DeskJet 500 printer ink cartridge was obtained commercially. To 3.9 gram of the ink from that cartridge was added 0.625 gram of a 20% solution of the hydroxyethylated polyethylenimine of the foregoing preferred formula and 1 gram ammonium benzoate. The structure of the dyes had both carboxylate and sulfonate solubilizing groups. (The dyes are a mixture of dyes identical to or corresponding closely to those of U.S. Pat. No. 4,963,189 mentioned under "Background of the Invention"). Printing from this mixture exhibited dramatically improved waterfastness to a level substantially that of the foregoing preferred formula.

Addition of 2.5% by weight of the hydroxyethylated of the foregoing preferred formula and 8% by weight ammonium benzoate to three commercial ink formulas known as Diconix color inks improved their waterfastness very significantly.

Waterfastness is measured by controlled soaking in water of paper printed with the dye. The percent waterfastness is the percent of optical density retained after a five minute soak in deionized water, observed, for example, by an optical densitometer. Inks which were only 35% waterfast when modified accordance with this invention to include ammonium said exhibit over 90% waterfastness.

The preferred formula has no humectant, since it is not necessary. Other formulations would be expected to include glycol ethers, 2-pyrrolidone, or other cosolvents to maintain solubility of the dye. The preferred formula was selected because it exhibits consistent reliability during drop on demand printing.

We claim:

1. A liquid ink composition comprising a dye solubilizing groups consisting essentially of anionic groups and not having a quaternary ammonium group, a polar solubilizing liquid providing a liquid vehicle for said dye in said ink, a polyethyleneimine hydroxy alkyl substituted at about 95% or greater of the available imine nitrogens, and an ammonium salt in sufficient amount to act upon loss of salt polar liquid with said dye and said polyethyleneimine to provide waterfastness of said dye of at least substantially neutral or acidic water.

2. The ink of claim 1 in which said ammonium salt is ammonium benzoate, ammonium chloride, or ammonium acetate.

3. The ink of claim 2 in which said ammonium salt is ammonium benzoate.

4. The ink of claim 3 in which said polyethyleneimine is hydroxyethylated.

5. The ink of claim 1 in which said polyethyleneimine is hydroxyethylated.

6. The ink of claim 2 in which said polyethyleneimine is hydroxyethylated.

7. The ink of claim 6 in which said dye is Food Black 2.

8. The ink of claim 4 in which said dye is Food Black 2.

9. A liquid ink composition for waterfast printing comprising a dye having solubilizing groups consisting essentially of anionic groups and not having a quaternary ammonium group, a polyethyleneimine hydroxy alkyl substituted at about 95% or greater of available imine nitrogens, an ammonium salt, and water, as a vehicle for said dye.

10. The ink of claim 9 in which said ammonium salt is ammonium benzoate, ammonium chloride, or ammonium acetate of more than 2% percent by weight of said ink.

11. The ink of claim 10 in which salt ammonium salt is ammonium benzoate.

12. The ink of claim 11 in which said polyethyleneimine is hydroxyethylated and is about 2.5% by weight of said ink.

13. The ink of claim 9 in which said polyethyleneimine is hydroxyethylated.

14. The ink of claim 10 in which said polyethyleneimine is hydroxyethylated and is about 2.5% by weight of said ink.

15. The ink of claim 14 in which said dye is Food . Black 2 of about 3% percent by weight.

16. The ink of claim 11 in which said dye is Food Black 2 of about 3% by weight.

* * * * *